(12) United States Patent
Kim et al.

(10) Patent No.: US 11,450,033 B2
(45) Date of Patent: Sep. 20, 2022

(54) APPARATUS AND METHOD FOR EXPERIENCING AUGMENTED REALITY-BASED SCREEN SPORTS MATCH

(71) Applicant: ELECTRONICS AND TELECOMMUNICATIONS RESEARCH INSTITUTE, Daejeon (KR)

(72) Inventors: Jong Sung Kim, Daejeon (KR); Youn Hee Gil, Daejeon (KR); Seong Min Baek, Daejeon (KR); Hee Sook Shin, Daejeon (KR); Seong Il Yang, Daejeon (KR); Cho Rong Yu, Daejeon (KR); Sung Jin Hong, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 17/362,023

(22) Filed: Jun. 29, 2021

(65) Prior Publication Data

US 2022/0138997 A1    May 5, 2022

(30) Foreign Application Priority Data

Nov. 5, 2020  (KR) .................. 10-2020-0146763

(51) Int. Cl.
| | |
|---|---|
| *G06T 11/00* | (2006.01) |
| *G06F 3/01* | (2006.01) |
| *G06F 3/16* | (2006.01) |
| *G06V 40/20* | (2022.01) |

(52) U.S. Cl.
CPC .............. *G06T 11/00* (2013.01); *G06F 3/011* (2013.01); *G06F 3/016* (2013.01); *G06F 3/16* (2013.01); *G06V 40/20* (2022.01)

(58) Field of Classification Search
CPC ........... G06T 11/00; G06F 3/011; G06F 3/016
USPC ........................................................ 345/633
See application file for complete search history.

(56) References Cited

U.S. PATENT DOCUMENTS

| | | | |
|---|---|---|---|
| 2013/0222427 A1 | 8/2013 | Heo et al. | |
| 2013/0283214 A1 | 10/2013 | Kim et al. | |
| 2015/0301596 A1* | 10/2015 | Qian ................... | G06F 3/013 345/633 |
| 2019/0054379 A1 | 2/2019 | Ackley et al. | |
| 2019/0104235 A1* | 4/2019 | Sarkar ................. | H04N 21/816 |

(Continued)

FOREIGN PATENT DOCUMENTS

| | | |
|---|---|---|
| JP | 2003180896 A | 7/2003 |
| KR | 20170028605 A | 3/2017 |

(Continued)

OTHER PUBLICATIONS

Xin Gao et al., "ARPP: An Augmented Reality 3D Ping-Pong Game System on Android Mobile Platform", IEEE WOCC, pp. 1-6, May 9, 2014.

*Primary Examiner* — Thomas J Lett
(74) *Attorney, Agent, or Firm* — Rabin & Berdo, P.C.

(57) ABSTRACT

Provided are an apparatus and method for experiencing an augmented reality (AR)-based screen sports match which enable even a child, an elderly person, and a person with a disability to easily and safely experience a ball sports match, such as tennis, badminton, or squash, as a screen sports match without using a wearable marker or sensor, a wearable display, an actual ball, and an actual tool.

16 Claims, 6 Drawing Sheets

(56) References Cited

U.S. PATENT DOCUMENTS

2019/0327392 A1* 10/2019 Sarkar .................. H04N 13/344
2020/0086219 A1    3/2020 Shim et al.

FOREIGN PATENT DOCUMENTS

KR    20180083252 A    7/2018
KR    10-2088333 B1    3/2020

* cited by examiner

APPARATUS AND METHOD FOR EXPERIENCING AUGMENTED REALITY-BASED SCREEN SPORTS MATCH

CROSS-REFERENCE TO RELATED APPLICATION

This application claims priority to and the benefit of Korean Patent Application No. 10-2020-0146763 filed on Nov. 5, 2020, the disclosure of which is incorporated herein by reference in its entirety.

BACKGROUND

1. Field of the Invention

The present invention relates to a technology for experiencing a sports match and, more particularly, to a technology for experiencing an augmented reality (AR)-based sport game using an indoor screen.

2. Discussion of Related Art

With the development of augmented reality (AR) technology, screen sports technology is attracting attention. Screen golf is a typical example of screen sports technology.

Existing screen sports technology, including screen golf, generates all virtual content related to sports, such as objects, video, and sound, through computer equipment, and thus there is a limit to visually and aurally providing a sense of reality as in real sports.

According to the existing screen sports technology, a user uses an actual ball and tool in person indoors. Accordingly, there is a risk of injury when two or more users experience a sports match at the same time in one place.

Also, the existing screen sports technology cannot support sports matches in which two or more users compete against each other, for example, tennis, badminton, and squash, like real sports matches.

Moreover, according to the existing screen sports technology, an experienced user can skillfully use actual tools (e.g., a ball and a racket) for a corresponding sports match while an inexperienced user or a user with reduced mobility (e.g., a child, an elderly person, or a person with a disability) cannot skillfully use the tool for the corresponding sports match. Accordingly, accessibility for users with reduced mobility is degraded.

SUMMARY OF THE INVENTION

The present invention is directed to providing an apparatus and method for experiencing an augmented reality (AR)-based screen sports match so that two or more users may experience a sports match in an indoor space.

The above and other objects, advantages, and features of the present invention and methods for achieving them will become apparent to those of ordinary skill in the art from exemplary embodiments described in detail below with reference to the accompanying drawings.

According to an aspect of the present invention, there is provided a method of experiencing an AR-based screen sports match including imaging, by a camera device installed in a first indoor space, actions of first users present in the first indoor space to generate actual image data, recognizing, by a first operating system installed in the first indoor space, the actions of the first users from the image data to generate first motion recognition data, generating, by the first operating system, tactile feedback information and force feedback information on the basis of the first motion recognition data, generating, by haptic devices which are used instead of actual sports tools by the first users, a tactile sensation and a kinesthetic sensation corresponding to a feeling of hitting that the first users have from the actual sports tools on the basis of the tactile feedback information and the force feedback information, receiving, by the first operating system, second motion recognition data, which represents motion recognition results of second users present in a second indoor space, from a second operating system installed in the second indoor space and generating AR contents on the basis of the second motion recognition data, and projecting, by a beam projector installed in the first indoor space, beams corresponding to the AR contents on a screen installed in the first indoor space.

According to another aspect of the present invention, there is provided an apparatus for experiencing an AR-based screen sports match including a camera device installed in a first indoor space and configured to acquire actual image data by imaging actions of first users present in the first indoor space, a motion recognition device installed in the first indoor space and configured to generate first motion recognition data by recognizing the actions of the first users from the image data, a haptic control device configured to generate tactile feedback information and force feedback information on the basis of the first motion recognition data, haptic devices used instead of actual sports tools by the first users and configured to generate a tactile sensation and a kinesthetic sensation corresponding to a feeling of hitting that the first users have from the actual sports tools on the basis of the tactile feedback information and the force feedback information, an AR content generation device configured to receive second motion recognition data, which represents motion recognition results of second users present in a second indoor space, from a second operating system installed in the second indoor space and generate AR contents on the basis of the second motion recognition data, and a beam projector installed in the first indoor space and configured to generate beams corresponding to the AR contents and project the beams on a screen installed in the first indoor space.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

The present invention may be variously changed and include various embodiments, and specific embodiments will be shown in the accompanying drawings and described in detail. However, it should be understood that this is not to limit the scope of the present invention to the specific embodiments, and the present invention includes all modification, equivalents, and alternations included in the spirit and technical scope of the present invention.

The terminology used herein is for the purpose of describing specific embodiments only and is not intended to be limiting to the present invention. Unless the context clearly indicates otherwise, the singular forms include the plural forms as well. It will be understood that the terms "comprise," "include," and "have," when used herein, specify the presence of stated features, numbers, steps, operations, elements, parts, or combinations thereof but do not preclude the presence or addition of one or more other features, numbers, steps, operations, parts, or combinations thereof.

Unless otherwise defined, all terms including technical and scientific terms used herein have the same meaning as commonly understood by those of ordinary skill in the art to which the present invention pertains. Terms defined in generally used dictionaries should be construed as having meanings matched with contextual meanings in the art. Unless defined clearly, terms are not construed as ideally or excessively formal meanings.

The present invention provides an augmented reality (AR)-based screen sports service in which users present in an indoor space may experience a sports match (a ball sports match), such as tennis, badminton, or squash, without wearing a marker, a sensor, a display, etc. with other users present in another indoor space.

Also, the present invention provides AR-based screen sports service in which it is possible to experience screen sports using a haptic device for providing tactile and force feedbacks interoperating with motion recognition instead of actual tools (a tennis racket, a tennis ball, a badminton racket, a shuttlecock, a squash racket, a squash ball, a net, etc.) used in corresponding sports matches.

Hereinafter, exemplary embodiments of the present invention will be described in detail with reference to the accompanying drawings.

Figure 1:
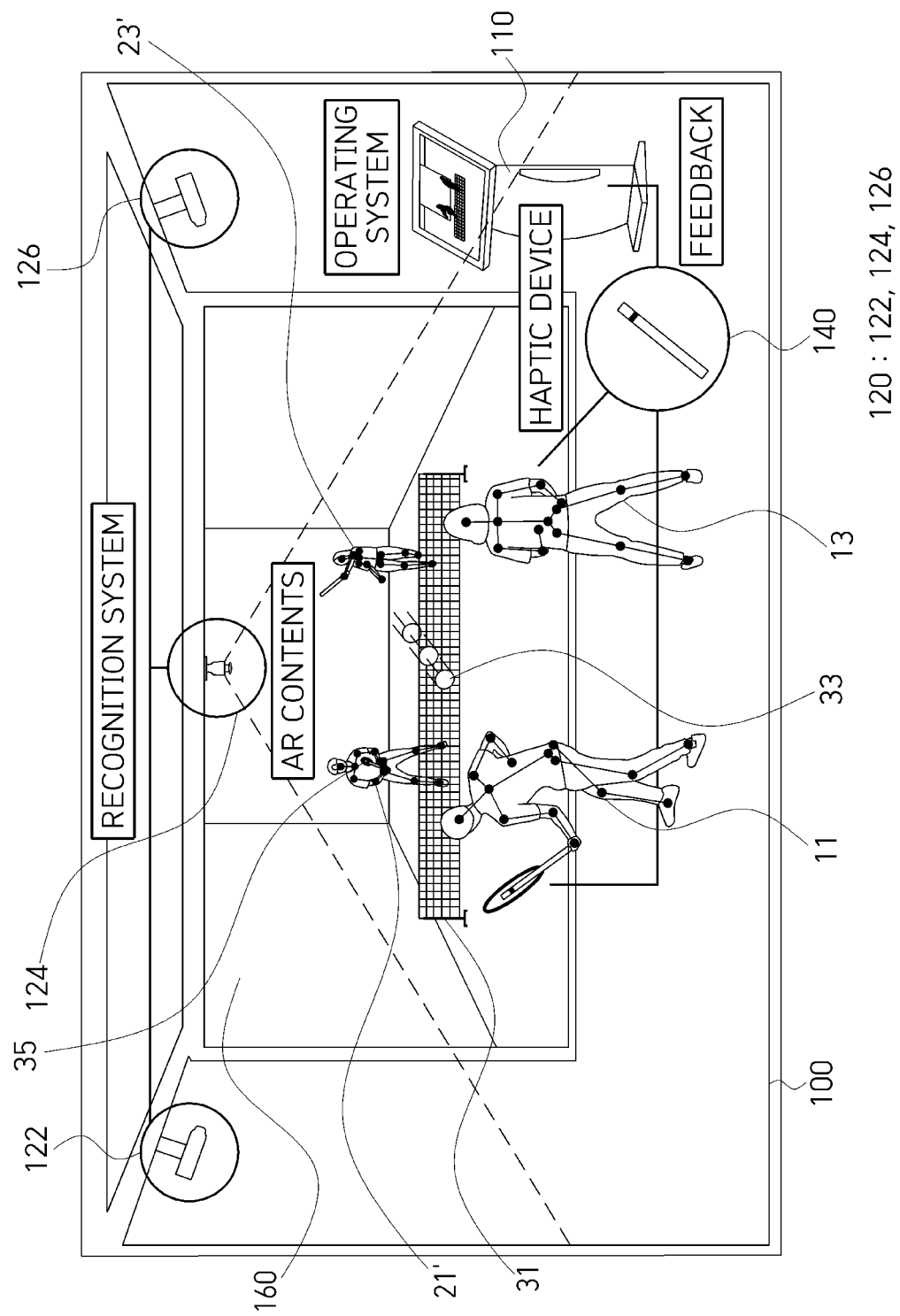
FIG. 1 is a view showing a first indoor space in which an apparatus for experiencing an augmented reality (AR)-based screen sports match is installed according to an exemplary embodiment of the present invention.
Figure 2:
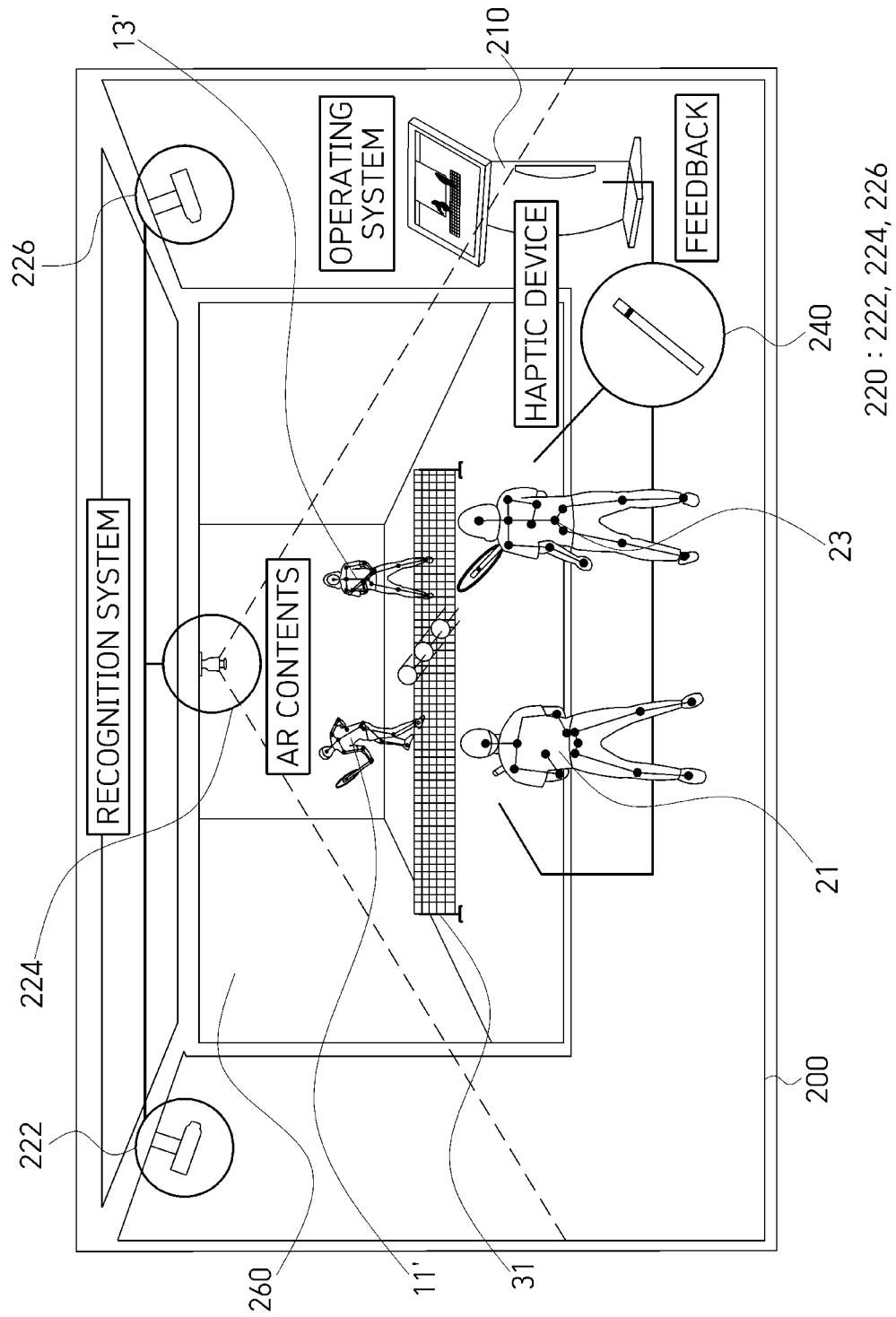
FIG. 2 is a view showing a second indoor space in which the apparatus for experiencing an AR-based screen sports match is installed according to the exemplary embodiment of the present invention.

FIG. 1 is a view showing a first indoor space in which an apparatus for experiencing an AR-based screen sports match is installed according to an exemplary embodiment of the present invention, and FIG. 2 is a view showing a second indoor space in which the apparatus for experiencing an AR-based screen sports match is installed according to the exemplary embodiment of the present invention.

A first indoor space 100 shown in FIG. 1 is physically separated from a second indoor space 200 shown in FIG. 2. In the first indoor space 100, two or more users 11 and 13 are present to experience a screen sports match, and in the second indoor space 200 shown in FIG. 2, two or more other users 21 and 23 are present to experience the screen sports match with the two or more users 11 and 13 present in the first indoor space 100.

A first camera device 120 including a plurality of cameras 122, 124, and 126 for recognizing motion of the users 11 and 13 is installed on the ceiling and the side walls of the first indoor space 100 shown in FIG. 1.

Likewise, a second camera device 220 including a plurality of cameras 222, 224, and 226 for recognizing motion of the users 21 and 23, who want to experience the sports match with the users 11 and 13 present in the first indoor space 100, is installed on the ceiling and the side walls of the second indoor space 200 shown in FIG. 2.

Screens 160 and 260 are installed on the front sides of the indoor spaces 100 and 200, respectively. Each screen displays AR contents in which actual images of opponent users and virtual object images related to the sports match that the users 11, 13, 21, and 23 want to experience are mixed (included). Here, the virtual object images may include a virtual background image obtained by virtualizing an actual playing field (the stands and the net), virtual tool images obtained by virtualizing actual tools (tennis rackets and a tennis ball, badminton rackets and a shuttlecock, or squash rackets and a squash ball), and the like.

The users 11 and 13 in the first indoor space 100 and the users 21 and 23 in the second indoor space 200 experience the sports match using haptic devices 140 and 240 instead of actual sports tools (tennis rackets, a tennis ball, badminton rackets, a shuttlecock, squash rackets, a squash ball, a net, etc.) related to the sports match that the users 11, 13, 21, and 23 want to experience.

Operating systems 110 and 210 are installed in the first and second indoor spaces 100 and 200, respectively. The users 11, 13, 21, and 23 may set a way in which the sports match that the users 11, 13, 21, and 23 want to experience is played using a user interface provided in the operating systems 110 and 120.

Also, the operating systems 110 and 210 communicate with each other and control and manage devices installed in the indoor spaces 100 and 200 using information transmitted and received in the communication process.

Although not shown in FIGS. 1 and 2 to simplify the drawings, a microphone device, a beam projector, an audio output device, etc. may be further installed in each indoor space.

The apparatus for experiencing an AR-based screen sports match according to the exemplary embodiment of the present invention will be described below with reference to FIG. 3.

Figure 3:
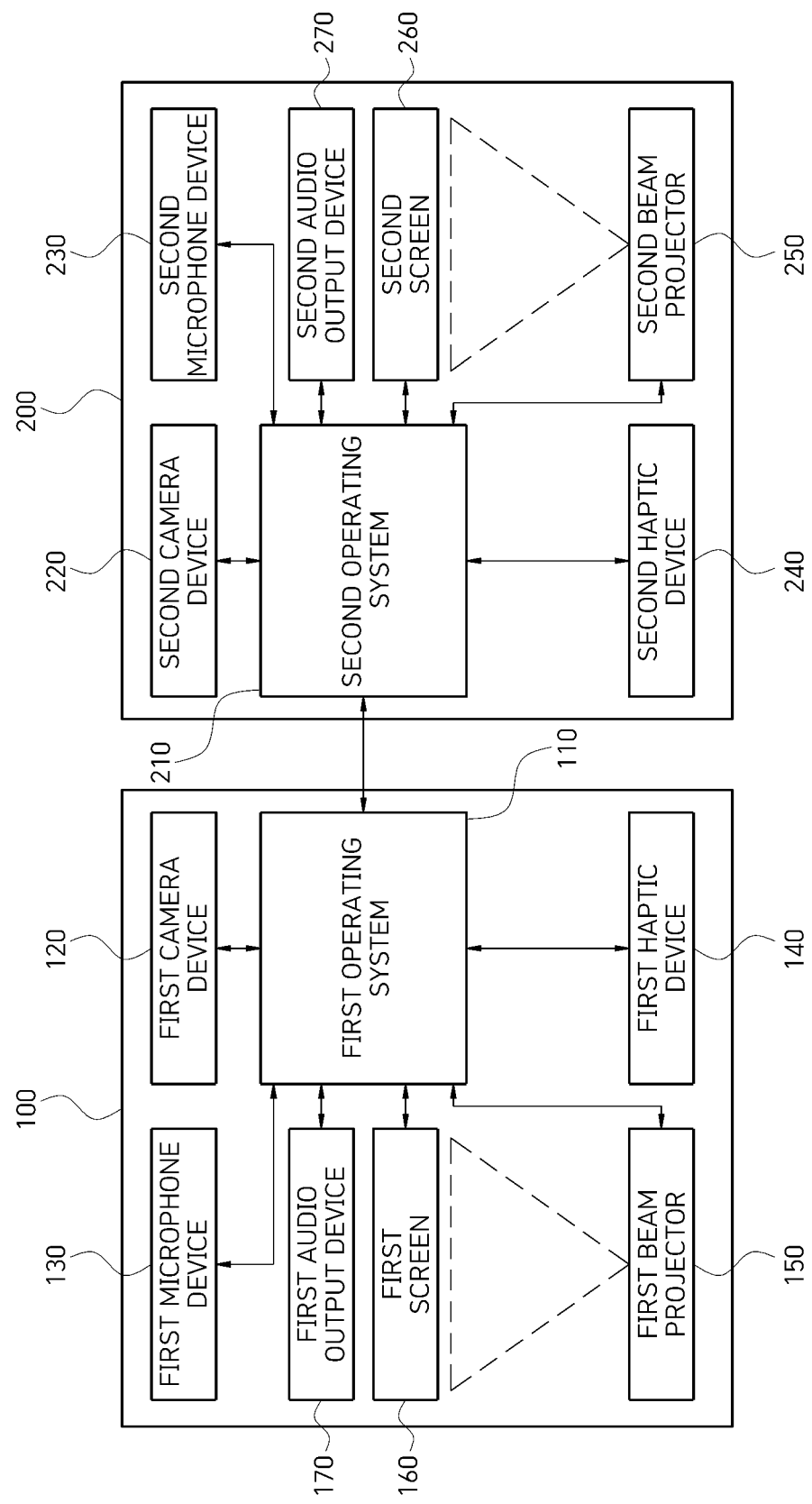
FIG. 3 is a block diagram schematically showing an internal configuration of the apparatus for experiencing an AR-based screen sports match according to the exemplary embodiment of the present invention.

FIG. 3 is a block diagram schematically showing an internal configuration of the apparatus for experiencing an AR-based screen sports match according to the exemplary embodiment of the present invention.

Referring to FIG. 3, the apparatus for experiencing an AR-based screen sports match installed in the first indoor space 100 includes the first operating system 110, the first camera device 120, a first microphone device 130, the first haptic device 140, a first beam projector 150, the first screen 160, and a first audio output device 170.

The first operating system 110 may basically control and manage overall operations of the first camera device 120, the microphone device 130, the first haptic device 140, the first beam projector 150, the first screen, and the first audio output device 170 and may be a computer.

The first operating system 110 communicates with the second operating system 210 installed in the second indoor space 200 in a wired or wireless manner, receives second motion recognition data and second voice data of the opponent users 21 and 23 from the second operating system 210, and generates AR contents to be displayed on the first screen 160 on the basis of the received second motion recognition data and second voice data of the opponent users 21 and 23.

Here, the second motion recognition data received from the second operating system 210 may include data related to images, a hitting action, a hitting time, a hitting viewpoint, a hitting position, and a hitting speed of the opponent users 21 and 23 required for sports simulation, and the second voice data received from the second operating system 210 may be data related to voices of the opponent users 21 and 23.

Also, the first operating system 110 transmits first motion recognition data and first voice data of the users 11 and 13 present in the first indoor space 100 to the second operating system 210, and the second operating system 210 generates AR contents to be displayed on the second screen 260 on the basis of the first motion recognition data and the first voice data received from the first operating system 110.

The first camera device 120 generates image data by imaging actions of the users 11 and 13 to recognize actions of the users 11 and 13 and transmits the image data to the first operating system 110. Subsequently, the first operating system 110 generates first motion recognition data by processing the image data received from the first camera device 120.

The first camera device 120 includes the plurality of cameras 122, 124, and 126, and each camera may be implemented as, for example, a red-green-blue depth (RGB-D) camera which easily recognizes actions of the users 11 and 13 in the form of a three-dimensional (3D) skeleton. In this case, image data acquired by the first camera device 120 may be RGB-D image data.

The plurality of RGB-D cameras may interoperate with each other through a camera calibration technique. In this case, the plurality of RGB-D cameras function as multi-viewpoint RGB-D cameras rather than single viewpoint RGB-D cameras and thus may solve problems including the lack of viewpoints, a limited range, errors, etc. which are disadvantages of a single viewpoint RGB-D camera.

The first microphone device 130 transmits the first voice data acquired by collecting (or recording) voices of the users 11 and 13 present in the first indoor space 100 to the first operating system 110.

The first haptic device 140 is used by the users 11 and 13 present in the first indoor space 100 instead of an actual sports tool (a tennis racket, a tennis ball, a badminton racket, a shuttlecock, a squash racket, a squash ball, a net, etc.).

According to control of the first operating system 110, the first haptic device 140 provides (generates) a virtual feeling of hitting a ball with an actual sports tool by interoperating with motion recognition of the users 11 and 13 present in the first indoor space 100. Here, the virtual feeling of hitting includes a tactile feedback and a kinesthetic or force feedback.

To provide such a virtual feeling of hitting, the first haptic device 140 may include, for example, a vibration actuator and a collision actuator.

The vibration actuator generates a tactile sensation of vibration according to tactile feedback information received from the first operating system 110 through wireless communication, and the collision actuator generates a kinesthetic sensation of collision according to force feedback information received from the first operating system 110 through wireless communication.

In addition, the first haptic device 140 may further include a wireless communication module to wirelessly communicate with the first operating system 110.

The first beam projector 150 receives AR image data based on the second motion recognition data of the users 21 and 23 present in the second indoor space 200 from the first operating system 110 and generates and projects beams corresponding to the received AR image data on the first screen 160, thereby displaying AR contents corresponding to the AR image data through the first screen 160.

The first audio output device 170 receives AR audio data based on the second voice data of the users 21 and 23 present in the second indoor space 200 from the first operating system 110 and outputs the received AR audio.

Here, the AR audio data may be obtained by combining the second voice data of the users 21 and 23 present in the second indoor space 200 and virtual hitting sound data.

The apparatus for experiencing an AR-based screen sports match installed in the second indoor space 200 includes the second operating system 210, the second camera device 220, a second microphone device 230, the second haptic device 240, a second beam projector 250, the second screen 260, and a second audio output device 270, which have the same functionality as the above-described elements 110 to 170. Accordingly, each element will be briefly described.

The second camera device 220 transmits image data acquired by imaging actions of the users 21 and 23 present in the second indoor space 200 to the second operating system 210.

The second camera device 220 includes the plurality of cameras 222, 224, and 226, and each camera may be an RGB-D camera.

The second microphone device 230 transmits the second voice data acquired by collecting voices of the users 21 and 23 present in the second indoor space 200 to the second operating system 210.

The second haptic device 240 is used by the users 21 and 23 present in the second indoor space 200 instead of an actual sports tool (a tennis racket, a tennis ball, a badminton racket, a shuttlecock, a squash racket, a squash ball, a net, etc.).

According to control of the second operating system 210, the second haptic device 240 provides (generates) a virtual feeling of hitting a ball with an actual sports tool by interoperating with motion recognition of the users 21 and 23 present in the second indoor space 200.

To provide such a virtual feeling of hitting, the second haptic device 240 may include, for example, a vibration actuator and a collision actuator.

The second beam projector 250 receives AR image data based on the first motion recognition data of the users 11 and 13 present in the first indoor space 100 from the second operating system 210 and generates and projects beams corresponding to the received AR image data on the second screen 260, thereby displaying AR contents corresponding to the AR image data through the second screen 260.

The second audio output device 270 receives AR audio data based on the first voice data of the users 11 and 13 present in the first indoor space 100 from the second operating system 210 and outputs the received AR audio.

Here, the AR audio data may be obtained by combining the first voice data of the users 11 and 13 present in the first indoor space 100 and virtual hitting sound data.

Figure 4:
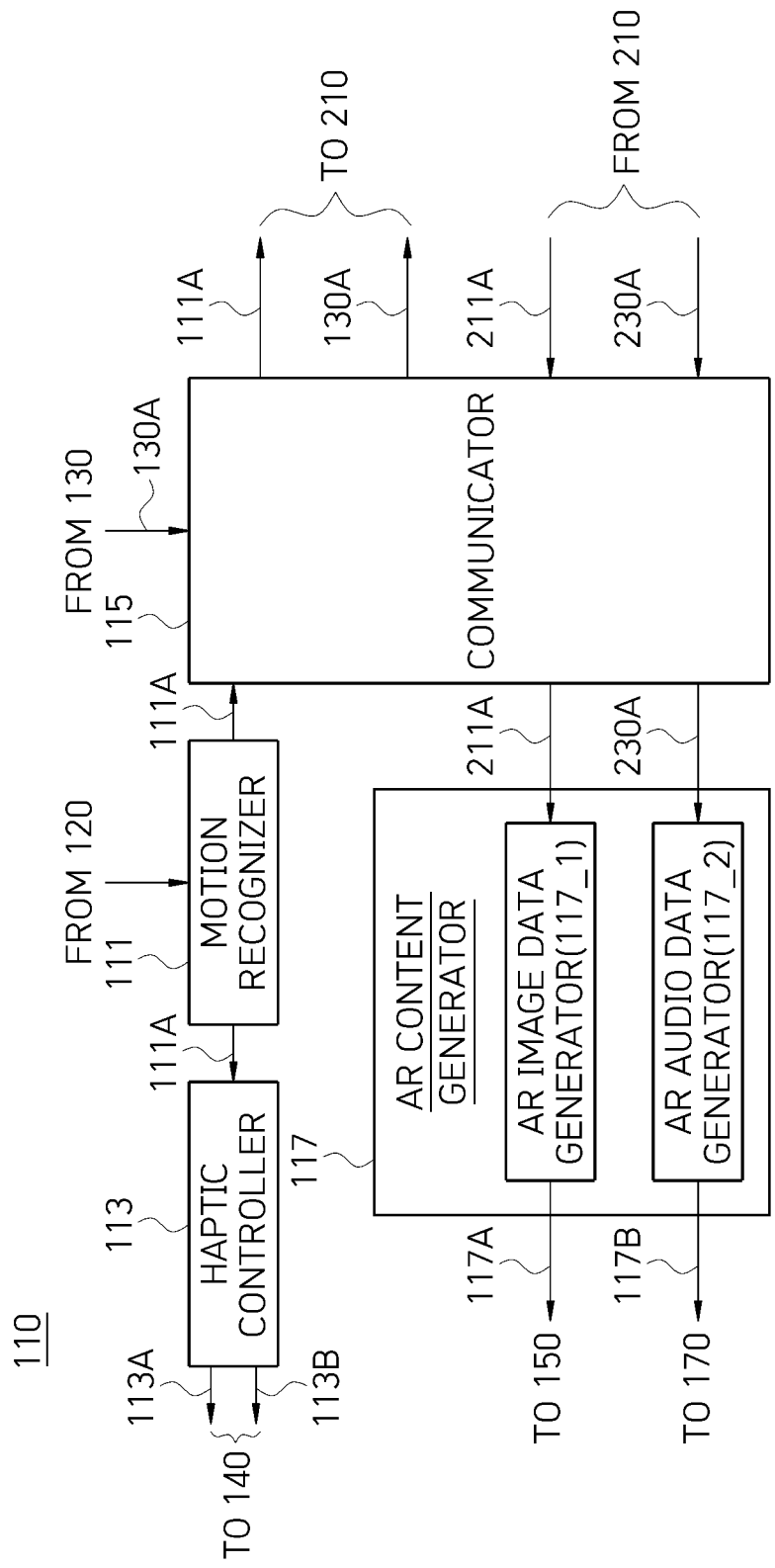
FIG. 4 is a block diagram schematically showing an internal configuration of a first operating system shown in FIG. 3.

FIG. 4 is a block diagram schematically showing an internal configuration of a first operating system shown in FIG. 3.

Referring to FIG. 4, the first operating system 110 includes a motion recognizer 111, a haptic controller 113, a communicator 115, and an AR content generator 117.

The motion recognizer 111 receives image data of the users 11 and 13 present in the first indoor space 100 from the first camera device 120, recognizes actions of the users 11 and 13 by processing the received image data, and outputs first motion recognition data 111A as the recognition result.

The image data may be RGB-D image data, and the first motion recognition data 111A may include data related to images, a hitting action, a hitting time, a hitting viewpoint, a hitting position, and a hitting speed of the users 11 and 13.

As a method of recognizing actions of the users 11 and 13, a method of recognizing sports actions of the users 11 and 13 in the form of a 3D skeleton on the basis of RGB values and depth values included in the RGB-D image data may be used.

To control the first haptic device 140, the haptic controller 113 generates tactile feedback information 113A and force feedback information 113B interoperating with motion recognition of the users 11 and 13 on the basis of the first motion recognition data 111A received from the motion recognizer 111 and transmits the pieces of information 113A and 113B to the first haptic device 140 in a wireless communication manner.

The first haptic device 140 may include a wireless communicator for receiving the pieces of information 113A and 113B, a vibration actuator, a collision actuator, and a controller for controlling operations of the vibration actuator and the collision actuator.

The vibration actuator generates a tactile sensation of vibration according to the tactile feedback information 113A received from the haptic controller 113, and the collision actuator generates a kinesthetic sensation of collision according to the force feedback information 113B received from the haptic controller 113.

The communicator 115 communicates with the second operating system 210 installed in the second indoor space 200 in a wired or wireless manner.

The communicator 115 transmits the first motion recognition data 111A received from the motion recognizer 111 to the second operating system 210 and transmits first voice data 130A of the users 11 and 13, who are present in the first indoor space 100, transmitted from the first microphone device 130 to the second operating system 210.

Also, the communicator 115 receives second motion recognition data 211A and second voice recognition data 230A of the users 21 and 23 present in the second indoor space 200 from the second operating system 210 and transmits the data 211A and 230A to the AR content generator 117.

The second motion recognition data 211A includes data related to images, a hitting action, a hitting time, a hitting viewpoint, a hitting position, and a hitting speed of the opposite users 21 and 23 required for sports simulation.

The AR content generator 117 includes an AR image data generator 117_1 and an AR audio data generator 117_2.

The AR image data generator 117_1 generates AR image data 117A on the basis of the second motion recognition data 211A received from the second operating system 210 through the communicator 115.

Specifically, the AR image data generator 117_1 extracts data related to actual image data, data related to a hitting action, data related to a hitting time, data related to a hitting viewpoint, data related to a hitting position, and data related to a hitting speed of the users 21 and 23 present in the second indoor space 200 from the second motion recognition data 211A. Subsequently, the AR image data generator 117_1 generates virtual object images to be combined with the actual image data of the opposite users 21 and 23.

The virtual object images include a virtual background image 31 obtained by virtualizing an actual playing field (the stands and the net), virtual tool images 33, 35 obtained by virtualizing actual tools (a tennis racket, a tennis ball, a badminton racket, a shuttlecock, a squash racket, and a squash ball) used in the corresponding sport, and the like.

While the virtual background image 31 is a static virtual object image which does not change over time, the virtual tool images 33, 35 are dynamic object images which are changed on the basis of data related to a hitting action, a hitting time, a hitting viewpoint, a hitting position, and a hitting speed of the opposite users 21 and 23. In other words, tools (the racket and the ball) depicted as the virtual tool images are changed in shape and movement speed in real time over time in images. A hitting action may also be used as a term encompassing a hitting time, a hitting viewpoint, a hitting position, and a hitting speed.

Subsequently, the AR image data generator 117_1 generates the AR image data 117A by combining the actual image data and the virtual object images changed according to the hitting action of the opposite users 21 and 23 and transmits the AR image data 117A to the first beam projector 150. Then, the first beam projector 150 generates beams corresponding to the AR image data 117A received from the AR image data generator 117_1 and projects the generated beams on the first screen 160.

The AR audio data generator 117_2 generates AR audio data 117B by combining (or augmenting) virtual hitting sound data with the second voice data 230A and transmits the AR audio data 117B to the first audio output device 170.

The first audio output device 170 converts the AR audio data 117B into an audio signal and outputs the audio signal to the first indoor space 100.

Like this, the device according to the exemplary embodiment of the present invention simultaneously provides visual AR contents displayed by the first screen 160 and aural AR content output by the first audio output device 170 such that users can experience a screen sports match like a real sports match.

Also, an actual tool (a racket) used in an actual sports match is replaced by the haptic device 140 so that two or more users can safely experience a screen sports match in the same indoor space.

Further, an actual tool (a tennis ball, a shuttlecock, a squash ball, etc.) used in an actual sports match is replaced by an augmented virtual tool (a virtual tennis ball, a virtual shuttlecock, a virtual squash ball, etc.) such that even users who suffer inconvenience in physical activities can easily experience a screen sports match.

Figure 5:
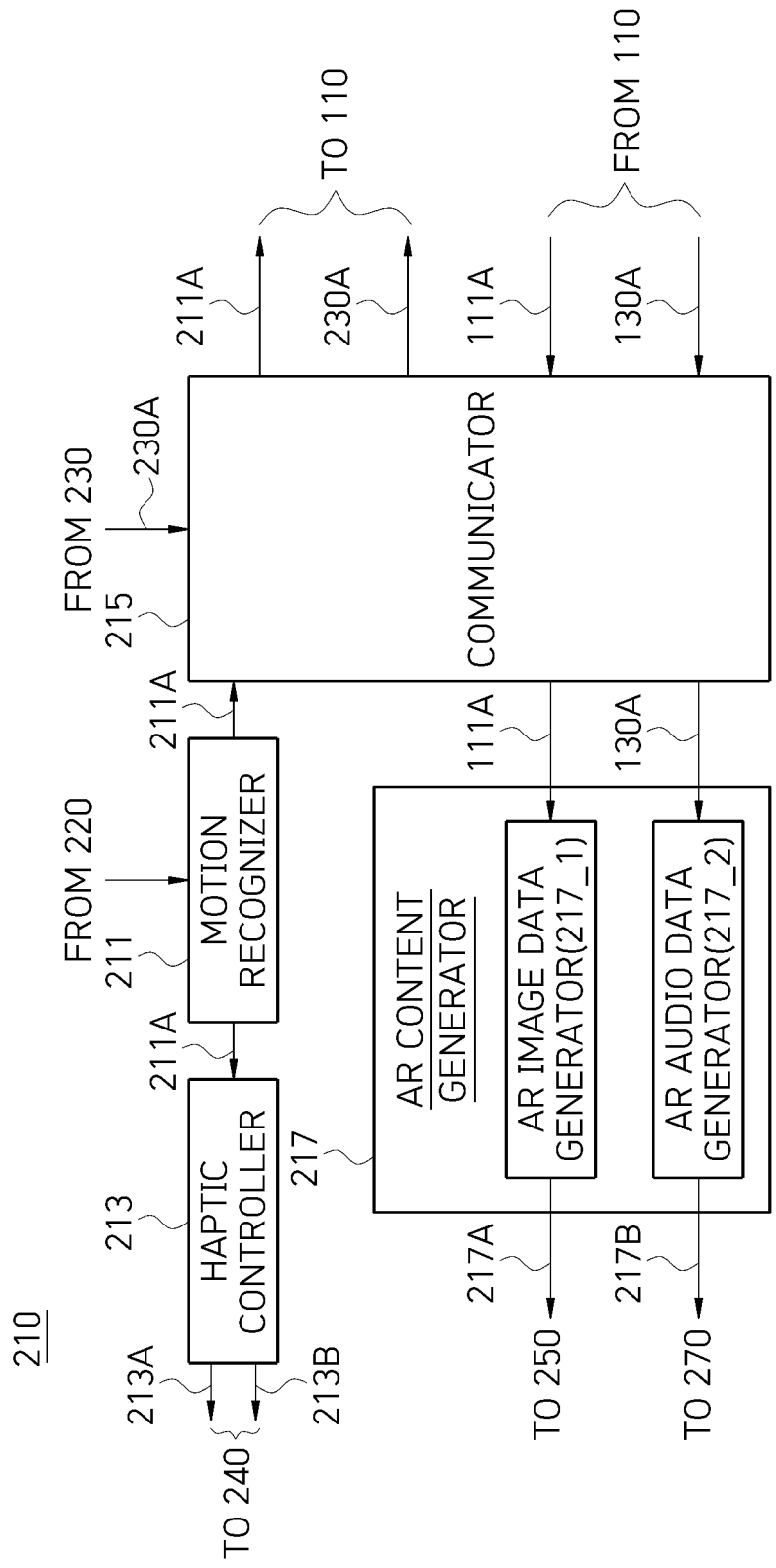
FIG. 5 is a block diagram schematically showing an internal configuration of a second operating system shown in FIG. 3.

FIG. 5 is a block diagram schematically showing an internal configuration of a second operating system shown in FIG. 3.

Referring to FIG. 5, the second operating system 210 includes a motion recognizer 211, a haptic controller 113, a communicator 215, and an AR content generator 217. These elements 211, 213, 215, and 217 have the same functions as the elements 111, 113, 115, and 117 shown in FIG. 4. Accordingly, the elements 211, 213, 215, and 217 may be well understood from the above descriptions of the elements 111, 113, 115, and 117 without detailed descriptions thereof.

A detailed description of each element will be omitted, and only what the reference numerals shown in FIG. 5 represent will be described.

The reference numeral 211A indicates data to be transmitted to the first operating system 110, that is, second motion recognition data which represents action recognition results of the users 21 and 23 present in the second indoor space 200. Here, the second motion recognition data 211A includes actual image data of the users 21 and 23 present in the second indoor space 200 and data related to a hitting action (e.g., a hitting time, a hitting viewpoint, a hitting position, and a hitting speed).

The reference numeral 213A indicates tactile feedback information for controlling an operation of the vibration actuator included in the second haptic device 240.

The reference numeral 213B indicates force feedback information for controlling an operation of the collision actuator included in the second haptic device 240.

The reference numeral 230A indicates data to be transmitted to the first operating system 110, that is, second voice data of the users 21 and 23, who are present in the second indoor space 200, provided by the second microphone device 230.

The reference numeral 217A indicates image data which is generated by an AR image data generator 217_1 and which will be transmitted to the second beam projector 250, that is, AR image data generated by combining actual image data of the users 11 and 13, who are present in the first indoor space 100, received from the first operating system 110 and a virtual object image interoperating with a hitting action of the users 11 and 13.

The reference numeral 217B indicates audio data which is generated by an AR audio data generator 217_2 and which will be transmitted to the second audio output device 270, that is, AR audio data generated by combining first voice data of the users 11 and 13, who are present in the first indoor space 100, received from the first operating system 110 and virtual hitting sound data.

A method based on the above-described apparatus for experiencing an AR-based screen sports match is described below.

First, an operation is performed in which a camera device installed in a first indoor space generates actual image data by capturing actions of first users present in the first indoor space.

Subsequently, an operation is performed in which a first operating system installed in the first indoor space generates first motion recognition data by recognizing the actions of the first users from the image data.

Subsequently, an operation is performed in which the first operating system generates tactile feedback information and force feedback information on the basis of the first motion recognition data.

Subsequently, an operation is performed in which haptic devices, which are used instead of actual sports tools by the first users, generate a tactile sensation and a kinesthetic sensation corresponding to a feeling of hitting that the first users may have from the actual sports tools on the basis of the tactile feedback information and the force feedback information.

Subsequently, an operation is performed in which the first operating system receives second motion recognition data, which represents action recognition results of second users present in a second indoor space, from a second operating system installed in the second indoor space and generates AR contents on the basis of the second motion recognition data.

Subsequently, an operation is performed in which a beam projector installed in the first indoor space projects beams corresponding to the AR contents on a screen installed in the first indoor space.

According to the exemplary embodiment, the operation of generating the actual image data may be an operation of generating RGB-D image data which is used for recognizing actions of the first users in the form of a 3D skeleton.

According to the exemplary embodiment, the operation of generating the first motion recognition data may be an operation of generating the first motion recognition data including data related to a hitting action, a hitting time, a hitting viewpoint, a hitting position, and a hitting speed of the first users.

According to the exemplary embodiment, the operation of generating the tactile sensation and kinesthetic sensation may include an operation in which a vibration actuator included in the haptic device generates the tactile sensation according to the tactile feedback information and an operation in which a collision actuator included in the haptic device generates the kinesthetic sensation according to the force feedback information.

According to the exemplary embodiment, the operation of generating the AR contents may include an operation of extracting actual image data of the second users from the second motion recognition data, an operation of extracting data related to a hitting action of the second users (hereinafter, hitting action data) from the second motion recognition data, an operation of generating a virtual object image interoperating with the hitting action data of the second users, and an operation of generating the AR contents by combining the extracted actual image data of the second users and the virtual object image.

According to the exemplary embodiment, the virtual object image includes a background image obtained by virtualizing an actual playing field and virtual tool images obtained by virtualizing actual sports tools.

According to the exemplary embodiment, the virtual tool images may interoperate with the hitting action data of the second users.

According to the exemplary embodiment, the operation of generating the AR contents may further include an operation of receiving voice data of the second users from the second operating system and an operation of generating AR audio data by combining the voice data and virtual hitting sound data.

According to the exemplary embodiment, after the operation of generating the AR contents, the method may further include an operation in which an audio output device installed in the first indoor space outputs an audio signal corresponding to the AR audio data to the first indoor space.

Figure 6:
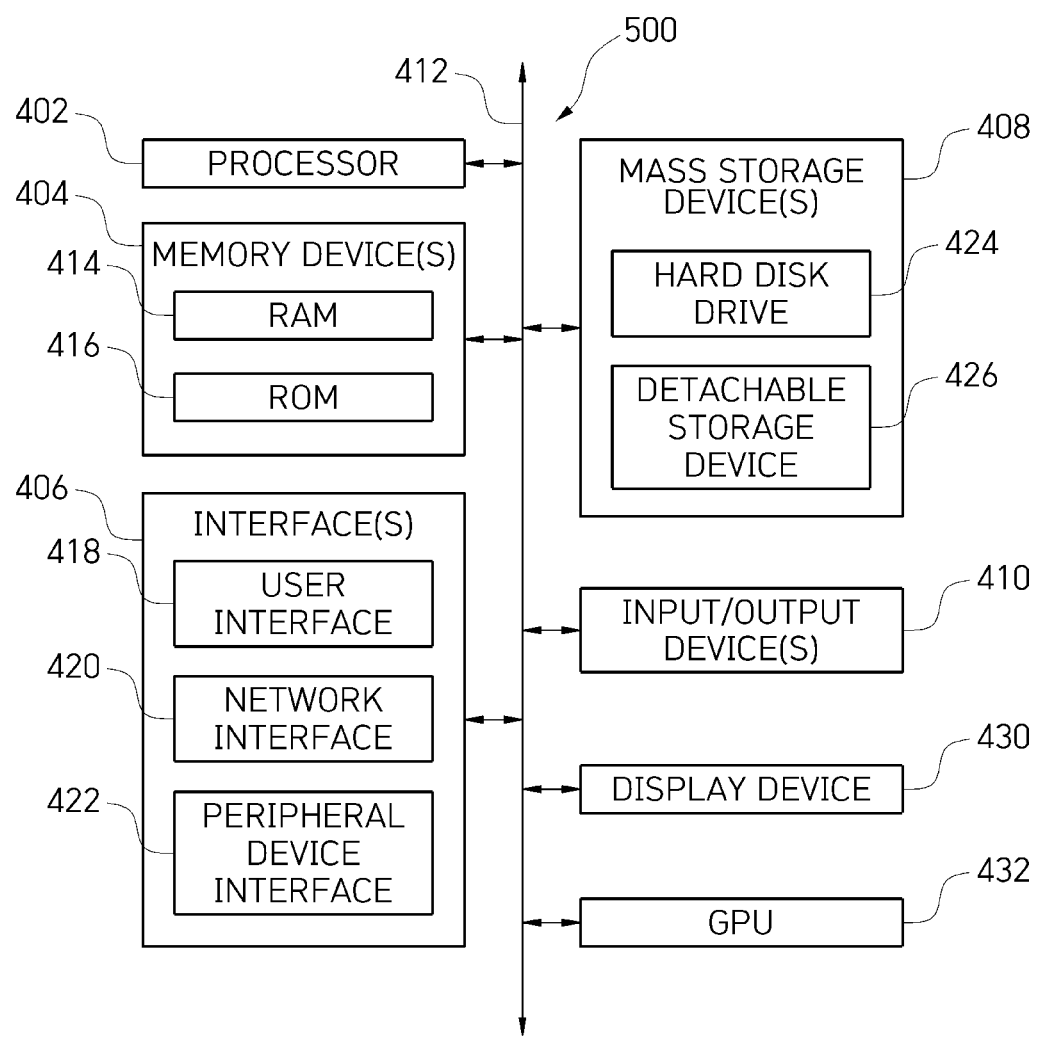
FIG. 6 is a block diagram of an exemplary computing device to which an inventive method of experiencing an AR-based screen sports match may be applied.

FIG. 6 is a block diagram of an exemplary computing device to which an inventive method of experiencing an AR-based screen sports match may be applied.

A computing device 500 may be used for performing various procedures disclosed herein. The computing device 500 may be any one of various computing devices such as a desktop computer, a laptop computer, a server computer, a portable computer, and a tablet computer.

The computing device 500 includes at least one processor (a central processing unit (CPU) and a graphics processing unit (GPU)) 402, at least one memory device 404, at least one interface 406, at least one mass storage device 408, at least one input/output (I/O) device 410, and a display device 430, all of which are connected to a bus 412.

The at least one processor 402 includes at least one processor or controller which executes commands stored in the at least one memory device 404 and/or the at least one mass storage device 408. The at least one processor 402 may also include various types of computer-readable media such as a cache memory.

The at least one memory device 404 includes various computer-readable media such as a volatile memory (e.g., a random access memory (RAM) 414) and/or a non-volatile memory (e.g., a read-only memory (ROM) 416). The at least one memory device 404 may also include an electrically erasable programmable ROM (EEPROM) such as a flash memory.

The at least one mass storage device 408 includes various computer-readable media such as a magnetic tape, a magnetic disk, an optical disk, and a solid-state memory (e.g., a flash memory). As shown in FIG. 6, a specific mass storage device is a hard disk drive 424. Various drives may also be included in the at least one mass storage device 408 to allow reading from various computer-readable media and/or recording on computer-readable media. The at least one mass storage device 408 includes a detachable storage device 426 and/or a fixed medium.

The at least one I/O device 410 includes various devices which allow data and/or other pieces of information to be input to a computing device 400 or to be searched through the computing device 400. Examples of the at least one I/O device 410 include a cursor control device, a keyboard, a keypad, a microphone, a monitor or another display device, a speaker, a printer, a network interface card, a modem, a lens, a charge-coupled device (CCD) or another image capture device, and the like.

The display device 430 includes any type of device for displaying information to one or more users of the computing device 400. Examples of the display device 430 include a monitor, a display terminal, a video projection device, and the like.

A GPU 432 may be connected to the at least one processor 402 and/or the display device 430. The GPU 432 may render computer-generated images and perform other graphics processing.

The GPU 432 may have all or some functions of a general-purpose processor such as the at least one processor 402. The GPU 432 may also have an additional function specified for graphics processing. The GPU 432 may have a hard-coded graphics function and/or a hard-wire graphics function related to other functions useful for coordinate transformation, shading, texturing, rasterization, and computer-generated image rendering.

The at least one interface 406 includes various interfaces which allow the computing device 400 to interact with another system, another device, or another computing environment.

Examples of the at least one interface 406 include an arbitrary number of different network interfaces 420 such as a local area network (LAN) interface, a wide area network (WAN) interface, a wireless network interface, and an Internet interface.

Other interfaces include a user interface 418 and a peripheral device interface 422.

The at least one interface 406 may also include one or more user interfaces 418. The at least one interface 406 may also include one or more peripheral device interfaces 422 such as interfaces for a printer, a pointing device (a mouse, a trackpad, etc.), a keyboard, and the like.

The bus 412 allows the at least one processor 402, the at least one memory device 404, the at least one interface 406, the at least one mass storage device 408, and the at least one I/O device 410 not only to communicate with each other but also to communicate with another device or element connected to the bus 412.

The bus 412 indicates at least one of various types of bus structures including a system bus, a peripheral component interconnect (PCI) bus, an Institute of Electrical and Electronics Engineers (IEEE) 1394 bus, a universal serial bus (USB), and the like.

According to a related art, an actual ball and an actual tool are used indoors, and thus it is very dangerous for two or more users to experience a game together in one space. On the contrary, according to the present invention, a virtual ball and a haptic device replacing an actual tool are used, and thus even two or more users can experience various ball sports matches indoors very safely.

According to the related art, an actual ball and an actual tool are used indoors, and thus it is very difficult for users, such as an elderly person and a person with a disability, to experience a sports match. On the contrary, according to the present invention, a virtual ball and a haptic device replacing an actual tool are used, and thus it is possible to provide a sports match experience according to the level of a user.

Unlike in actual sports, the related art does not enable two users to play a game while looking at each other and thus cannot support sports matches such as tennis, badminton, and squash. On the other hand, like in actual sports, the present invention enables users to compete against each other through AR based on two or more multi-screens installed in different spaces.

Finally, most of the related art is based on virtual reality (VR), and thus all of people, objects, and a background in sports contents are generated through a computer. Accordingly, it is difficult to provide a sense of reality as in actual sports. On the contrary, the present invention employs AR in which people in sports contents are processed as actual images and objects, a background, etc. are virtually processed. Consequently, it is possible to easily provide the sense of reality as in actual sports.

For purposes of illustration, programs and other executable program elements are shown here as discrete blocks. However, such programs and components may reside at various times in different storage elements of the computing device 400 and are executed by the at least one processor 402. Alternatively, the systems and procedures described herein can be implemented as hardware, software, or a combination of hardware, software, and firmware. For example, one or more application specific integrated circuits (ASICs) may be programmed to carry out one or more of the systems and procedures described herein.

The present invention has been described above with reference to the exemplary embodiments. Those of ordinary skill in the technical field to which the present invention pertains should be able to understand that various modifications and alterations can be made without departing from the essential features of the present invention. Therefore, it should be understood that the disclosed embodiments are not limiting but illustrative in all aspects. The scope of the present invention is defined not by the above description but by the following claims, and it should be understood that all changes or modifications derived from the scope and equivalents of the claims fall within the scope of the present invention.

What is claimed is:

1. A method of experiencing an augmented reality (AR)-based screen sports match, the method comprising:
   imaging, by a camera device installed in a first indoor space, actions of first users present in the first indoor space to generate actual image data;
   recognizing, by a first operating system installed in the first indoor space, the actions of the first users from the image data to generate first motion recognition data;

generating, by the first operating system, tactile feedback information and force feedback information on the basis of the first motion recognition data;

generating, by haptic devices which are used instead of actual sports tools by the first users, a tactile sensation and a kinesthetic sensation corresponding to a feeling of hitting that the first users have from the actual sports tools on the basis of the tactile feedback information and the force feedback information;

receiving, by the first operating system, second motion recognition data, which represents motion recognition results of second users present in a second indoor space, from a second operating system installed in the second indoor space and generating AR contents on the basis of the second motion recognition data; and projecting, by a beam projector installed in the first indoor space, beams corresponding to the AR contents on a screen installed in the first indoor space.

2. The method of claim 1, wherein the generating of the actual image data comprises generating red-green-blue depth (RGB-D) image data which is used for recognizing the actions of the first users in the form of a three-dimensional (3D) skeleton.

3. The method of claim 1, wherein the generating of the first motion recognition data comprises generating the first motion recognition data including data related to a hitting action, a hitting time, a hitting viewpoint, a hitting position, and a hitting speed of the first users.

4. The method of claim 1, wherein the generating of the tactile sensation and kinesthetic sensation comprises:

generating, by a vibration actuator included in the haptic device, the tactile sensation according to the tactile feedback information; and generating, by a collision actuator included in the haptic device, the kinesthetic sensation according to the force feedback information.

5. The method of claim 1, wherein the generating of the AR contents comprises:

extracting actual image data of the second users from the second motion recognition data;

extracting data related to hitting actions of the second users (hereinafter, hitting action data) from the second motion recognition data;

generating a virtual object image interoperating with the hitting action data of the second users; and generating the AR contents by combining the extracted actual image data of the second users and the virtual object image.

6. The method of claim 5, wherein the virtual object image includes a background image obtained by virtualizing an actual playing field and virtual tool images obtained by virtualizing actual sports tools.

7. The method of claim 5, wherein the virtual tool images interoperate with the hitting action data of the second users.

8. The method of claim 1, wherein the generating of the AR contents further comprises:

receiving voice data of the second users from the second operating system; and generating AR audio data by combining the voice data and virtual hitting sound data.

9. The method of claim 8, further comprising, after the generating of the AR contents, outputting, by an audio output device installed in the first indoor space, an audio signal corresponding to the AR audio data to the first indoor space.

10. An apparatus for experiencing an augmented reality (AR)-based screen sports match, the apparatus comprising:

a camera device installed in a first indoor space and configured to acquire actual image data by imaging actions of first users present in the first indoor space;

a motion recognition device installed in the first indoor space and configured to generate first motion recognition data by recognizing the actions of the first users from the image data;

a haptic control device configured to generate tactile feedback information and force feedback information on the basis of the first motion recognition data;

haptic devices used instead of actual sports tools by the first users and configured to generate a tactile sensation and a kinesthetic sensation corresponding to a feeling of hitting that the first users have from the actual sports tools on the basis of the tactile feedback information and the force feedback information;

an AR content generation device configured to receive second motion recognition data, which represents motion recognition results of second users present in a second indoor space, from a second operating system installed in the second indoor space and generate AR contents on the basis of the second motion recognition data; and a beam projector installed in the first indoor space and configured to generate beams corresponding to the AR contents and project the beams on a screen installed in the first indoor space.

11. The apparatus of claim 10, wherein the camera device includes a plurality of red-green-blue depth (RGB-D) cameras.

12. The apparatus of claim 11, wherein the plurality of RGB-D cameras acquire RGB-D image data, which is used for recognizing the actions of the first users in the form of a three-dimensional (3D) skeleton, as the actual image data.

13. The apparatus of claim 10, wherein the motion recognition device generates the first motion recognition data including data related to a hitting action, a hitting time, a hitting viewpoint, a hitting position, and a hitting speed of the first users.

14. The apparatus of claim 10, wherein the haptic devices comprise:

a vibration actuator configured to generate the tactile sensation according to the tactile feedback information; and a collision actuator configured to generate the kinesthetic sensation according to the force feedback information.

15. The apparatus of claim 10, wherein the AR content generation device comprises:

an AR image data generator configured to extract actual image data of the second users from the second motion recognition data, extract data related to hitting actions of the second users (hereinafter, hitting action data) from the second motion recognition data, generate a virtual object image interoperating with the hitting action data of the second users, and generate the AR contents by combining the actual image data of the second users and the virtual object image; and an AR audio data generator configured to receive voice data of the second users from the second operating system and generate AR audio data by combining the voice data and virtual hitting sound data.

16. The apparatus of claim 15, further comprising an audio output device configured to output an audio signal corresponding to the AR audio data to the first indoor space.

* * * * *